(12) United States Patent
Greenwood et al.

(10) Patent No.: US 11,192,455 B2
(45) Date of Patent: Dec. 7, 2021

(54) TRACTION CONTROLLER AND METHOD

(71) Applicant: JAGUAR LAND ROVER LIMITED, Coventry (GB)

(72) Inventors: Jeremy Greenwood, Warwickshire (GB); Georgios Sampardoukas, Warwickshire (GB); Philip Barber, Warwickshire (GB)

(73) Assignee: Jaguar Land Rover Limited, Coventry (GB)

(*) Notice: Subject to any disclaimer, the term of this patent is extended or adjusted under 35 U.S.C. 154(b) by 430 days.

(21) Appl. No.: 16/087,372

(22) PCT Filed: Mar. 20, 2017

(86) PCT No.: PCT/EP2017/056566
§ 371 (c)(1),
(2) Date: Sep. 21, 2018

(87) PCT Pub. No.: WO2017/162592
PCT Pub. Date: Sep. 28, 2017

(65) Prior Publication Data
US 2021/0046827 A1 Feb. 18, 2021

(30) Foreign Application Priority Data
Mar. 22, 2016 (GB) ...................... 1604854

(51) Int. Cl.
 *B60L 15/20* (2006.01)
 *B60K 7/00* (2006.01)
 *B60L 3/10* (2006.01)

(52) U.S. Cl.
 CPC ............ *B60L 15/20* (2013.01); *B60K 7/0007* (2013.01); *B60L 3/106* (2013.01);
 (Continued)

(58) Field of Classification Search
 CPC .... B60L 15/20; B60L 3/106; B60L 2240/429; B60L 2240/461; B60L 2240/463; B60L 2240/465; B60K 7/0007
 (Continued)

(56) References Cited

U.S. PATENT DOCUMENTS 4,709,194 A 11/1987 Yagi et al.
10,836,389 B2 * 11/2020 Bodendorf ...... B60W 30/18018
(Continued)

FOREIGN PATENT DOCUMENTS

GB 2258544 A 2/1993
GB 2454315 A 5/2009
(Continued)

OTHER PUBLICATIONS

International Search Report and Written Opinion, PCT/EP2017/056566, 13 pages, dated Jul. 17, 2017.
(Continued)

*Primary Examiner* — Gertrude Arthur Jeanglaude
(74) *Attorney, Agent, or Firm* — McCoy Russell LLP

(57) ABSTRACT

The present disclosure relates to a controller (7) for controlling an electric machine (6) to drive a wheel (4) of a vehicle (1). The controller (7) includes a processor (15) configured to determine an effective torque (T). A speed demand signal (27) for controlling the wheel speed is output by the processor (15). The processor is configured to detect changes in the effective torque (T) as the wheel speed (S) changes and to modify the speed demand signal (27) in dependence on the detected changes in the effective torque (T). The processor (15) may determine a derivative (dT/dS) of the effective torque (T) with respect to the wheel speed (S). The present disclosure also relates to a method of controlling an electric machine (6) to drive a wheel (4) of a vehicle (1).

20 Claims, 5 Drawing Sheets

(52) U.S. Cl.
CPC ... *B60L 2240/429* (2013.01); *B60L 2240/461* (2013.01); *B60L 2240/463* (2013.01); *B60L 2240/465* (2013.01)

(58) Field of Classification Search
USPC .......................................................... 701/23
See application file for complete search history.

(56) References Cited

U.S. PATENT DOCUMENTS

| | | | |
|---|---|---|---|
| 2004/0127326 A1* | 7/2004 | Tajima | B60W 10/10 |
| | | | 477/3 |
| 2014/0074328 A1 | 3/2014 | Schaffler | |
| 2015/0005988 A1 | 1/2015 | Cox | |
| 2015/0175009 A1 | 6/2015 | Beever et al. | |
| 2015/0298577 A1 | 10/2015 | Kobayashi et al. | |
| 2016/0167662 A1 | 6/2016 | Kobayashi et al. | |

FOREIGN PATENT DOCUMENTS

| | | |
|---|---|---|
| JP | H11254986 A | 9/1999 |
| WO | 2015063913 A | 7/2015 |

OTHER PUBLICATIONS

Search and Examination Report, GB1704391.0, 5 pages, dated Sep. 21, 2017.
Search and Examination Report, GB1604854.8, 5 pages, dated Oct. 3, 2016.

\* cited by examiner

TRACTION CONTROLLER AND METHOD

CROSS-REFERENCE TO RELATED APPLICATIONS

This application is a 371 of International Application No. PCT/EP2017/056566, filed Mar. 20, 2017, which claims priority to GB Patent Application 1604854.8, filed Mar. 22, 2016, the contents of both of which are incorporated by reference herein in their entirety.

TECHNICAL FIELD

The present disclosure relates to a controller and to a method. More particularly, the present disclosure relates to a controller for controlling an electric machine to drive a wheel of a vehicle; and to a method of controlling an electric machine to drive a wheel of a vehicle.

BACKGROUND

It is known to provide a controller for controlling a propulsion motor of a motor vehicle. Modern (brushless) motors, and in particular switched reluctance motors, are controlled by power electronics with commutation controlled in response to an estimate of the angular position of the motor. Within the controller, local speed control algorithms may be implemented using motor position information to estimate motor speed. A crude local speed controller can then be implemented using an internal closed loop control algorithm such as a proportional-integral-differential (PID) control algorithm to control the motor torque.

Electric machines may be employed to provide brake torque as well as drive torque, for example by implementing regenerative braking functionality. Known controllers for motor vehicle electric motors utilise a similar control structure to conventional anti-lock braking system (ABS) controllers.

A vehicle 101 incorporating a known vehicle propulsion apparatus 102 is illustrated schematically in FIG. 1. The vehicle 101 comprises a plurality of wheels 103, each wheel 103 being driven by a separate electric machine 104. A controller 105 receives an accelerator pedal signal 106 indicative of the amount of travel of an accelerator pedal (not shown) of the vehicle 101; and a wheel speed signal 107 indicative of the speed S of the wheel 103. The controller 105 calculates an amount of torque that should be developed by each electric machine 104 in order to drive the associated wheel 103. The controller 105 transmits a torque demand signal 108 to an inverter 109 that delivers power to the electric machine 104 to develop the required torque.

The controller 105 compares the wheel speed signal 107 to a vehicle reference speed VREF calculated by the controller 105. The reference speed value is an estimate of vehicle speed. Methods of calculating a value of vehicle reference speed VREF are known, and include calculating an average value of vehicle wheel speed, the speed of the slowest turning wheel, or the speed of the second slowest turning wheel. The vehicle reference speed Vref may be obtained from non-wheel systems, such as radar and optical techniques. The torque demand signal 108 is generated and output to the inverter 109 to cause the electric machine 104 to develop the required amount of torque. The torque required to control the wheel 103 to avoid excessive slip is not directly known, since the slip will vary depending on the nature of the surface. One approach would be to define a predefined slip ratio, for example 5%, which is used in the estimation of the wheel torque. When a slip condition is detected, for example due to a reduction in a surface coefficient of friction (mu) and/or an application of excessive torque, the torque demand signal 108 is generated incorporating the predefined slip ratio with a view to controlling the amount of slip and preventing excessive slip. A feedback loop attempts to control the wheel speed by varying the torque until the desired speed (slip ratio) is achieved. Thus, the controller 105 implements a traction control (TC) functionality in attempting to prevent excessive wheel slip.

A challenge remains to determine the optimum slip ratio for the prevailing tyre and ground conditions. At least in certain embodiments, the present invention seeks to overcome or ameliorate at least some of the disadvantages associated with the prior art.

SUMMARY OF THE INVENTION

Aspects of the present invention relate to a controller for controlling an electric machine to drive a wheel of a vehicle; to a vehicle comprising a controller; and to a method of controlling an electric machine to drive a wheel of a vehicle.

According to a further aspect of the present invention there is provided a controller for controlling an electric machine to drive a wheel of a vehicle, the controller comprising a processor configured to:

determine an effective torque; and output a speed demand signal for controlling the wheel speed;

wherein the processor is configured to detect changes in the effective torque as the wheel speed changes and to modify the speed demand signal in dependence on the detected changes in the effective torque. The effective torque may be determined at the wheel, particularly in the event that each wheel is driven by a separate motor. It will be appreciated that, should two or more wheels be driven by a common motor, the torque may be measured elsewhere, and the torque at the wheel inferred or calculated based on (for example) the action of a differential. The processor may be configured to receive a wheel speed signal indicative of the wheel speed of said wheel. In this case, the torque as a function of wheel speed can be determined by tracking the torque at the wheel and the speed of the wheel in parallel, a slip ratio at the wheel can be determined or estimated based thereon, and a slip ratio component of the speed demand signal adjusted to achieved maximum, or at least improved, traction or braking. Alternatively, the wheel speed may not be tracked (or may be tracked for other purposes but not used for the present purpose), and the wheel speed can be varied (dithered) dynamically to find, and maintain, a suitable wheel speed to achieve maximum (or at least improved) traction or braking. The effective torque is the torque transmitted by the wheel to the surface for propelling the vehicle. The processor may be configured to modify the wheel speed signal to increase the effective torque. At least in certain embodiments, the processor controls the wheel speed to maximise the effective torque at the wheel.

The processor may be configured to control the wheel speed in dependence on the detected change in the effective torque as the wheel speed changes. The processor may control the wheel speed in dependence on the magnitude of the change in the effective torque. The processor may control the wheel speed in dependence on whether the change in the effective torque is positive or negative (i.e. whether the effective torque increases or decreases). The processor may determine whether an increase or a decrease in the wheel speed results in an increase in the effective torque; and, in dependence on said determination, may modify the speed demand signal to increase or decrease the wheel speed in order to increase the effective torque.

The processor may be configured to control the wheel speed in dependence on a rate of change of the effective torque with respect to wheel speed. The rate of change of the effective torque with respect to wheel speed may be expressed as a derivative (dT/dS). The processor may be configured to determine the derivative of the effective torque with respect to the wheel speed (dT/dS). The processor may be configured to control the wheel speed in dependence on the determined derivative. The processor may be configured to determine when the determined derivative is substantially zero. When the determined derivative is zero, the effective torque at the wheel is at a maximum. The processor may be configured to identify a target wheel speed for which the determined derivative is substantially zero. The processor may be configured to modify the speed demand signal to control the wheel speed to achieve the target wheel speed. The optimum wheel value will vary or jitter on all but a completely uniform surface but a process of continually adjusting the wheel speed will allow the optimum value to be tracked. The maximum torque can thereby be transmitted by the wheel to the surface. At least in certain embodiments, the processor may be configured to modify the speed demand signal in dependence on the detected changes in the effective torque at least substantially in real time.

The controller may be configured to operate in a speed control mode and a torque control mode. The controller may, for example, change between said speed and torque control modes in dependence on a determined slip ratio.

The processor may be configured to implement wheel speed changes and to detect the changes in the effective torque in dependence on said implemented wheel speed changes. The processor may be configured to implement wheel speed changes and to detect the rate of change in the effective torque in dependence on said implemented wheel speed changes. The processor may be configured to modify the wheel speed signal to introduce a perturbation into the wheel speed, for example deviating from a target or requested wheel speed. The perturbation may be positive or negative. The magnitude and/or rate of change in the wheel speed may be controlled in dependence on the determined derivative. The variation in the wheel speed may, for example, be up to ±10% of the wheel speed.

The processor may be configured to identify a target wheel speed for increasing the effective torque at the wheel and to modify the speed demand signal to control the wheel speed to achieve the target wheel speed. Identifying the target wheel speed may comprise identifying the wheel speed when the determined derivative is substantially zero.

When the vehicle is accelerating, the processor may be configured to modify the speed demand signal to increase the wheel speed when the determined derivative is positive; and to decrease the wheel speed when the determined derivative is negative. The processor may be configured progressively to increase or decrease the wheel speed to maintain a positive value for the determined derivative when the vehicle is accelerating.

When the vehicle is decelerating, i.e. when the effective torque is negative, the processor may be configured to modify the speed demand signal to decrease the wheel speed when the determined derivative is positive; and to increase the wheel speed when the determined derivative is negative. The processor may be configured progressively to increase or decrease the wheel speed to maintain a negative value for the determined derivative when the vehicle is decelerating.

The speed demand signal may comprise a slip component generated in dependence on a slip ratio; the processor being configured to vary the slip ratio to vary the wheel speed. The processor may be configured to vary the slip ratio and to detect any changes in the effective torque. The processor may be configured to modify the speed demand signal by increasing or decreasing the slip ratio. The slip ratio may be modified in dependence on the change in the effective torque as the wheel speed changes. The slip ratio could, for example, be modified in dependence on the magnitude of the change in the effective torque; and/or in dependence on whether the change in the effective torque is positive or negative (i.e. whether the effective torque increases or decreases). The slip ratio may be modified in dependence on a determined rate of change of the effective torque with respect to wheel speed. The rate of change of the effective torque with respect to wheel speed may be expressed as a derivative. The processor may be configured to determine the derivative. The processor may be configured to identify the slip ratio when the determined derivative is substantially zero.

The processor may be configured to generate the slip component in dependence on the identified slip ratio.

When the vehicle is accelerating, the processor may be configured to increase the slip ratio when the determined derivative is positive; and to decrease the slip ratio when the determined derivative is negative. When the vehicle is accelerating, the slip ratio may be added to a target wheel speed. When the vehicle is decelerating, the processor may be configured to decrease the slip ratio when the determined derivative is positive; and to increase the slip ratio when the derivative is negative. When the vehicle is decelerating, the slip ratio may be subtracted from a target wheel speed. An acceleration slip ratio may be determined for use when the vehicle is accelerating. A deceleration slip ratio may be determined for use when the vehicle is decelerating.

The vehicle dynamic, such as cornering, may affect the optimum slip ratio in a predictable way. An algorithm may be implemented to determine a nominal slip ratio in dependence on one or more vehicle dynamic parameter. The processor may subsequently refine the slip ratio in accordance with the control strategy described herein to identify the optimum slip ratio. By basing the nominal slip ratio on one or more vehicle dynamic parameter, the identification of the optimum slip ratio can be optimised.

The processor may be configured to determine the effective torque at the wheel in dependence on a commutator current of the electric machine. The processor may reference the commutator current and the phase angle to determine the effective torque at the wheel. In an alternative arrangement, an inverter connected to the electric machine may determine with effective torque by referencing the commutation current and phase angle. In this arrangement, the processor may be configured to receive an effective torque signal from the inverter.

The processor may be configured to detect a slip condition and to modify the speed demand signal only when said slip condition has been detected.

The controller may be configured to control a plurality of electric machines to drive respective wheels of the vehicle.

According to a further aspect of the present invention there is provided a vehicle comprising a controller as described herein.

According to a further aspect of the present invention there is provided a method of controlling an electric machine to drive a wheel of a vehicle, the method comprising:
  determining an effective torque; and
    wherein the method comprises detecting changes in the effective torque as the wheel speed changes and modifying the speed demand signal in dependence on the detected changes in the effective torque. As explained previously, the effective torque may be determined at the wheel, particularly in the event that each wheel is driven by a separate motor. It will be appreciated that, should two or more wheels be driven by a common motor, the torque may be measured elsewhere, and the torque at the wheel inferred or calculated based on (for example) the action of a differential. The processor may be configured to receive a wheel speed signal indicative of the wheel speed of said wheel. The effective torque is the torque transmitted by the wheel to the surface for propelling the vehicle. At least in certain embodiments the method may comprise modifying the wheel speed signal to increase the effective torque.

The method may comprise changing the wheel speed and detecting any changes in the effective torque as said wheel speed changes.

The method may comprise controlling the wheel speed in dependence on the detected change in the effective torque as the wheel speed changes. The method may comprise controlling the wheel speed in dependence on the magnitude of the change in the effective torque. The method may comprise controlling the wheel speed in dependence on whether the change in the effective torque is positive or negative (i.e. whether the effective torque increases or decreases). The method may comprise determining whether an increase or a decrease in the wheel speed will increase the effective torque; and, in dependence on said determination, increasing or decreasing the wheel speed to increase the effective torque.

The method may comprise controlling the wheel speed in dependence on a determined rate of change of the effective torque with respect to wheel speed. The method may comprise determining a derivative of the effective torque with respect to the wheel speed. The method may comprise controlling the wheel speed in dependence on the determined derivative. At least in certain embodiments the wheel speed may be controlled to increase the effective torque at the wheel. The method may comprise identifying a target wheel speed for increasing the effective torque at the wheel; and controlling the wheel speed to achieve the target wheel speed. The target wheel speed may be identified as the wheel speed for which the determined derivative is substantially zero.

When the vehicle is accelerating, the method may comprise increasing the wheel speed when the determined derivative is positive; and decreasing the wheel speed when the determined derivative is negative. The method may comprise progressively increasing or decreasing the wheel speed to maintain a positive value for the determined derivative when the vehicle is accelerating.

When the vehicle is decelerating, the method may comprise decreasing the wheel speed when the determined derivative is positive; and increasing the wheel speed when the determined derivative is negative. The method may comprise progressively increasing or decreasing the wheel speed to maintain a negative value for the determined derivative when the vehicle is decelerating.

The wheel speed may comprise a slip component. The method may comprise generating the slip component in dependence on a slip ratio; wherein the slip ratio is modified to vary the wheel speed. The method may comprise modifying the slip ratio and detecting any changes in the effective torque. The method may comprise increasing or decreasing the slip ratio. The slip ratio may be modified in dependence on the change in the effective torque as the wheel speed changes. The slip ratio could, for example, be modified in dependence on the magnitude of the change in the effective torque; and/or in dependence on whether the change in the effective torque is positive or negative (i.e. whether the effective torque increases or decreases). The slip ratio may be modified in dependence on the rate of change of the effective torque with respect to wheel speed. The rate of change may be expressed as a derivative. The method may comprise identifying the slip ratio which results in the determined derivative being substantially zero.

The method may comprise determining the effective torque at the wheel in dependence on a commutator current of the electric machine.

The method may comprise detecting a slip condition and varying the wheel speed only when said slip condition has been detected.

The method may comprise implementing wheel speed changes and detecting the changes in the effective torque in dependence on said implemented wheel speed changes. The method may comprise implementing a wheel speed change and detecting the rate of change in the effective torque in dependence on said implemented wheel speed changes. The implemented changes in the wheel speed may comprise a perturbation in the wheel speed. The perturbation may, for example, deviate from a target or requested wheel speed. The perturbation may be positive or negative. The magnitude and/or rate of change in the wheel speed may be controlled in dependence on the determined derivative. The variation in the wheel speed may, for example, be up to ±10% of the wheel speed.

As used herein the term "processor" will be understood to include both a single processor and a plurality of processors collectively operating to provide any stated control functionality. To configure a processor, a suitable set of instructions may be provided which, when executed, cause said processor to implement the control techniques specified herein. The set of instructions may suitably be embedded in said one or more processors. Alternatively, the set of instructions may be provided as software saved on one or more memory associated with said processor to be executed on said processor. The instructions may be provided on a non-transitory computer readable media.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION

Figure 1:
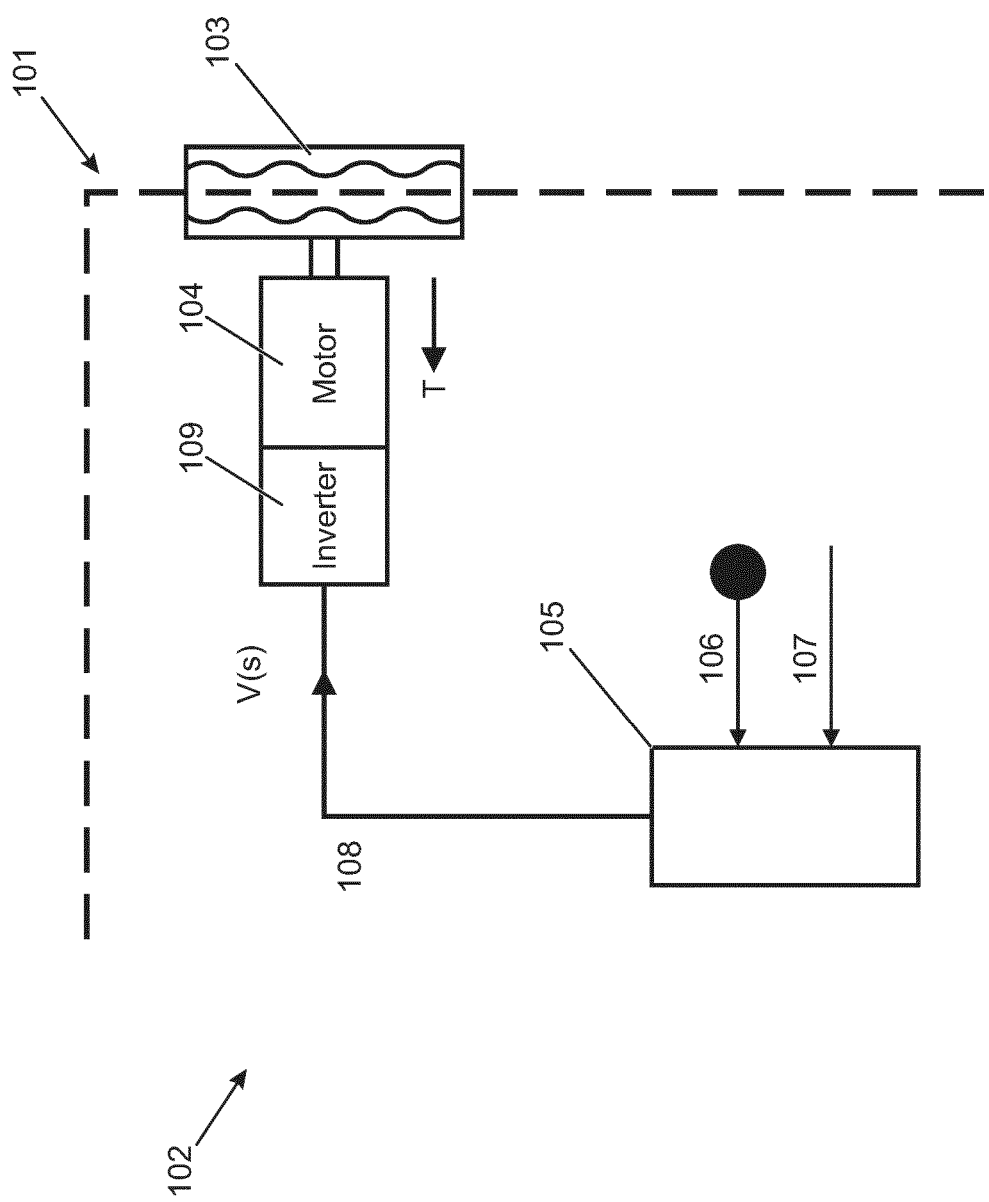
FIG. 1 shows a schematic representation of a prior art vehicle propulsion apparatus.
Figure 2:
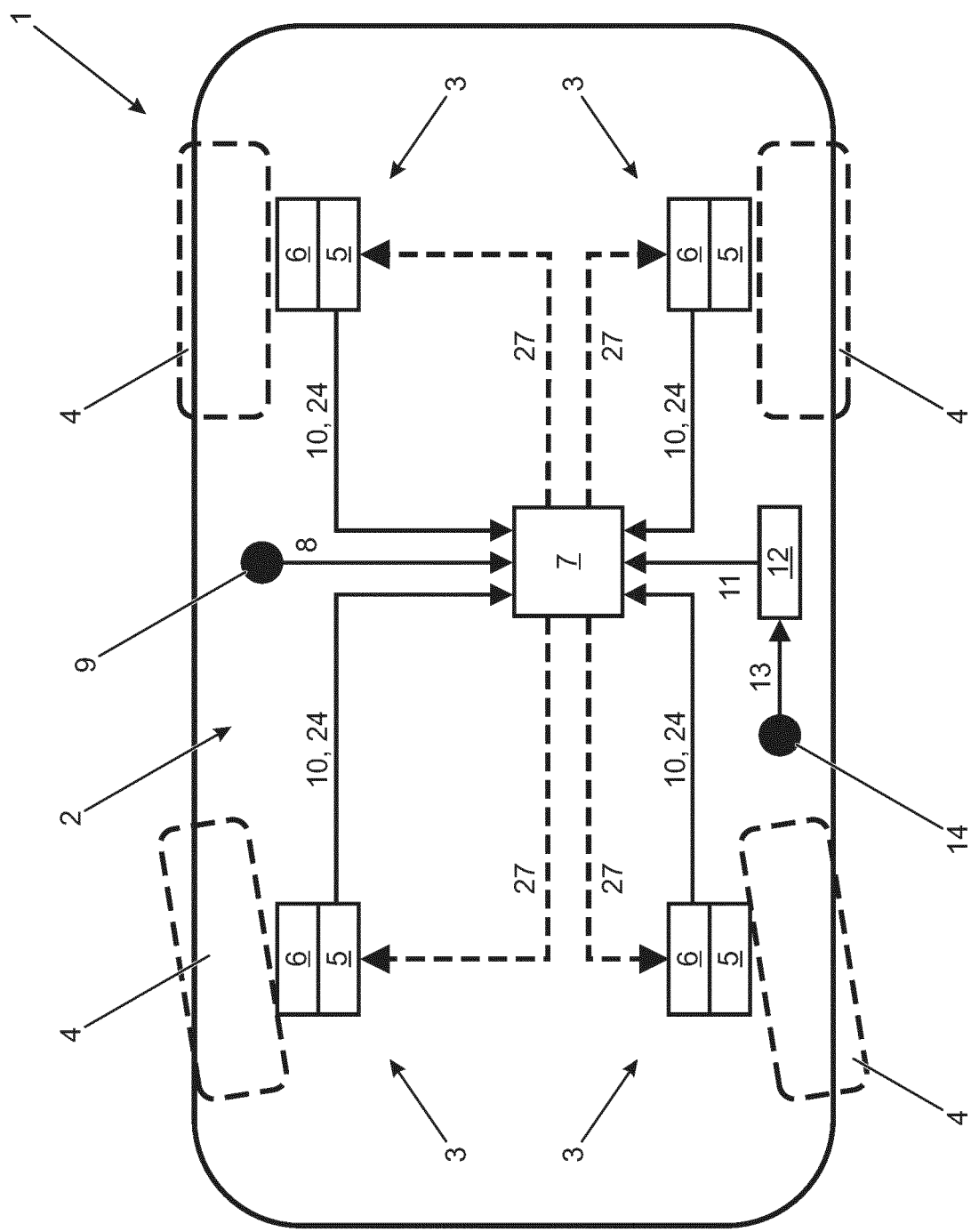
FIG. 2 shows a schematic representation of a vehicle incorporating a vehicle propulsion apparatus in accordance with an embodiment of the present invention.

A schematic illustration of a vehicle 1 incorporating a vehicle propulsion apparatus 2 according to an embodiment of the present invention is shown in FIG. 2. The vehicle 1 in the present embodiment is an electric vehicle (EV), but the present invention may be implemented in a hybrid electric vehicle (HEV) or a plug-in hybrid electric vehicle (PHEV).

As shown in FIG. 2, the vehicle propulsion apparatus 2 comprises four (4) drive units 3 for developing a tractive force to propel the vehicle 1. The vehicle 1 comprises four wheels 4, each having an associated drive unit 3 to provide the vehicle 1 with four-wheel drive capability. The drive units 3 each comprise an inverter 5 and an electric machine 6. The electric machines 6 are each operative to generate torque which is transmitted to the associated wheel 4. The operation of each of the drive units 3 is the same and, for the sake of brevity, the vehicle propulsion apparatus 2 is described herein with reference to a first drive unit 3 associated with the front right wheel 4 of the vehicle 1. The control of the other drive units 3 may be understood by extension. In alternate embodiments, the vehicle propulsion apparatus 2 may comprise two (2) drive units 3 associated with the front and rear wheels 4 respectively of the vehicle 1. In this arrangement, a first drive unit 3 is connected to the front wheels 4; and a second drive unit 3 is connected to the rear wheels 4. A front locking differential may be provided to limit slip of the front wheels 4 relative to each other; and a rear locking differential may be provided to limit slip of the rear wheels 4 relative to each other.

The vehicle propulsion apparatus 2 comprises a controller 7 for controlling operation of the drive units 3. The controller 7 receive an accelerator pedal signal 8 indicative of the amount of travel of an accelerator pedal 9; a wheel speed signal 10 indicative of the speed of each wheel 4; and a brake signal 11 from a brake controller 12 indicative of the amount of brake torque to be generated by the vehicle propulsion apparatus 2. The brake signal 11 is determined by the brake controller 12 at least in part according to a brake pedal signal 13 indicative of the amount of travel of a brake pedal 14. The controller 7 may be referred to as a powertrain controller in some embodiments. In some embodiments the controller 7 may be referred to as a motor controller.

Figure 3:
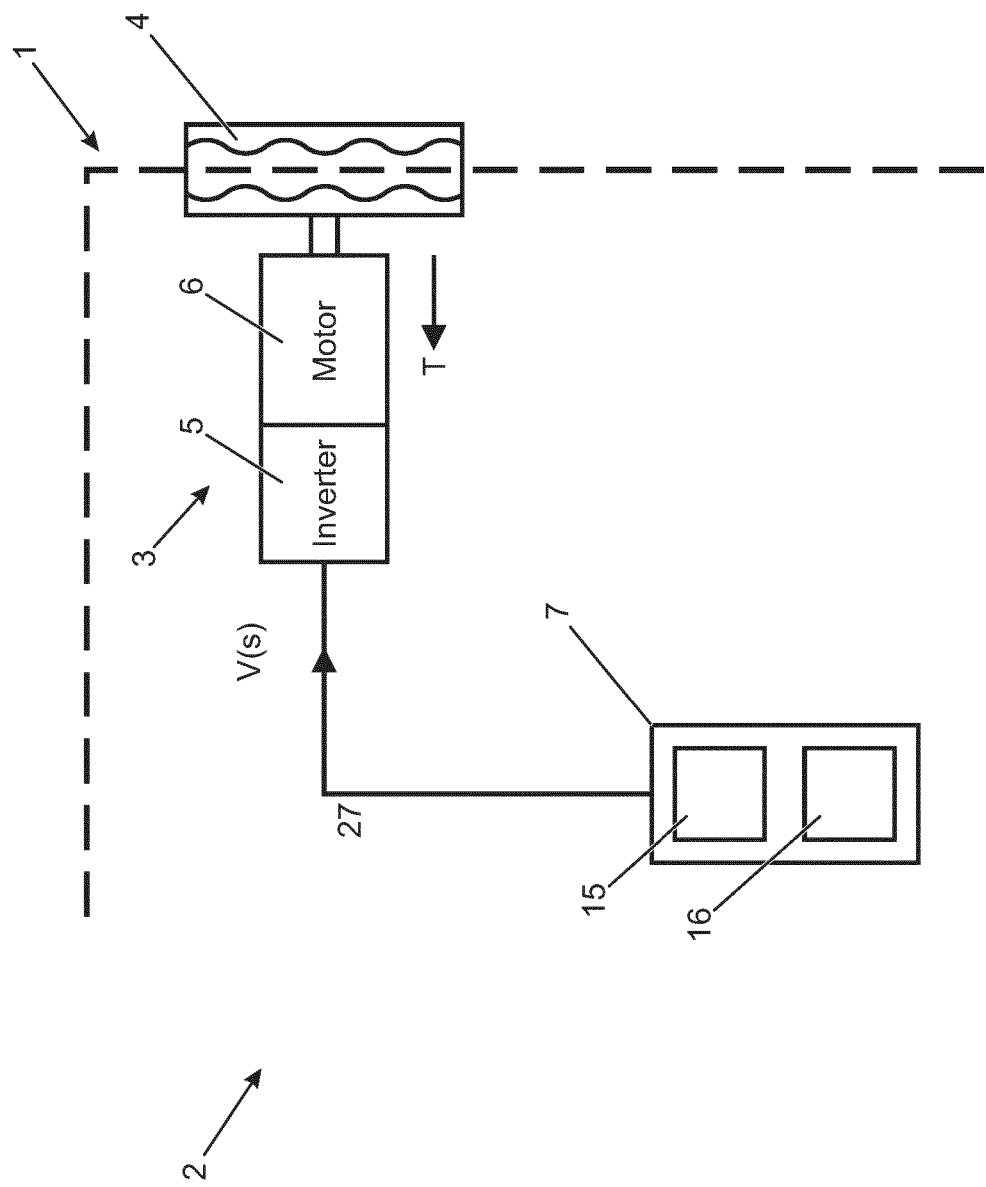
FIG. 3 shows a schematic representation of a drive unit associated with a wheel of the vehicle shown in FIG. 2.
Figure 4:
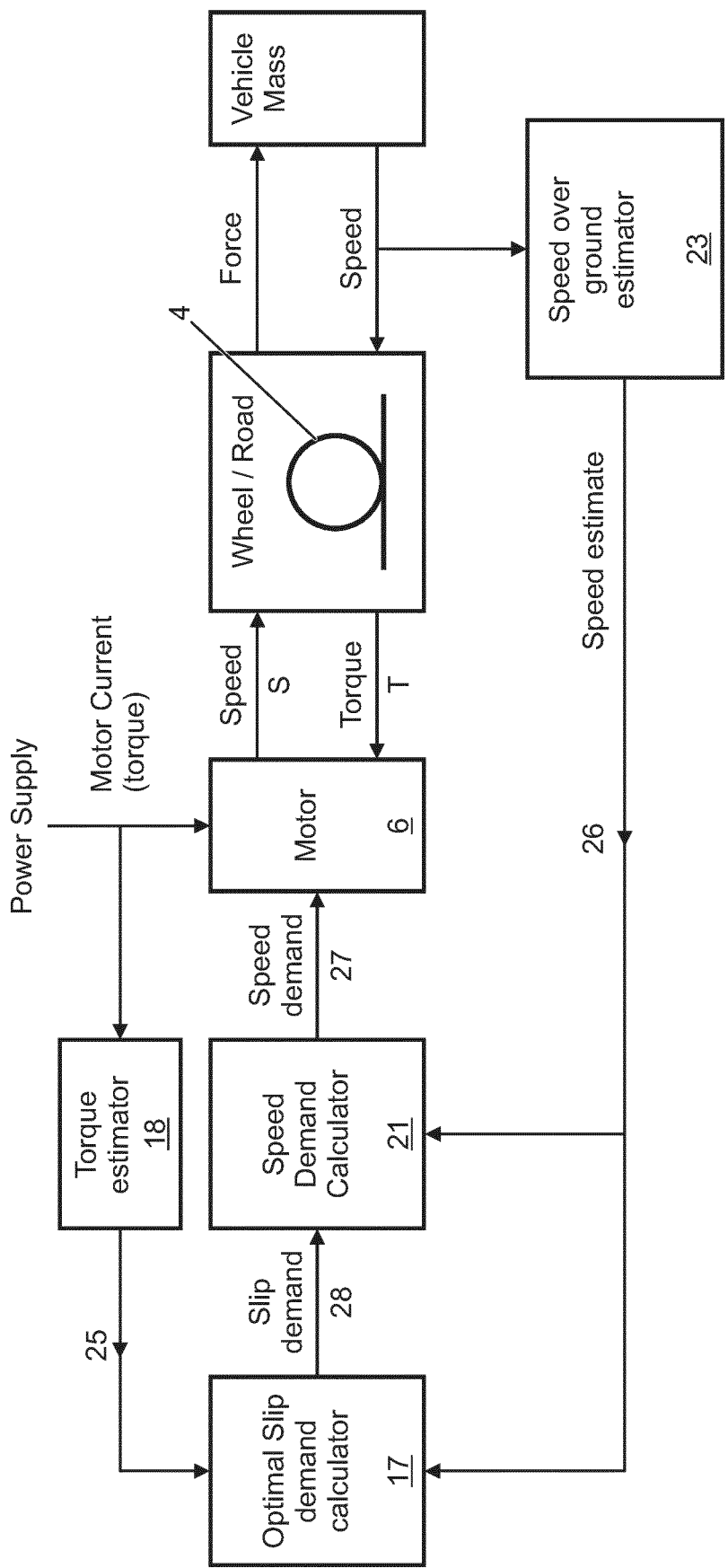
FIG. 4 shows a block diagram illustrating operation of the controller for the vehicle propulsion apparatus shown in FIG. 2 in a speed control mode.

As shown in FIG. 3, the controller 7 comprises at least one processor 15 coupled to system memory 16. The at least one processor 15 is configured to execute a set of non-transitory instructions stored in the system memory 16. As illustrated in FIG. 4, the set of instructions, when executed, cause the at least one processor 15 to implement a slip demand calculator 17, a torque estimator 18, a speed demand calculator 21 and a speed over ground estimator 23. In alternate embodiments, the at least one processor 15 may implement one or more of the following: a slip estimator, a wheel speed estimator and a torque controller.

The inverter 5 controls the electric machine 6 to force commutation at a constant speed (or position relative to the ground), or to nest a closed loop speed control. The current induced in the armature windings may be used to estimate the effective torque T at the wheels 4. The inverter 5 and/or the electric machine 6 provide a feedback signal 24 to the torque estimator 18 indicative of the speed of rotation of the electric machine 6. The feedback signal 24 comprises a commutation current signal indicative of the commutation current and a phase angle signal indicative of the phase angle of the electric machine 6. The torque estimator 18 utilises the commutation current and the phase angle to estimate the effective torque T at the wheel 4. The torque estimator 18 generates an effective torque signal 25 which is indicative of the effective torque T at the wheel 4. The effective torque signal 25 is output to the slip demand calculator 17.

A wheel speed sensor (not shown) generates the wheel speed signal 10 which is output to the speed over ground estimator 23. The speed over ground estimator 23 uses the wheel speed signal 10 to generate a vehicle reference speed signal 26 which is indicative of a vehicle reference speed VREF. In the present embodiment the vehicle reference speed VREF is set by the speed over ground estimator 23 as the speed of the slowest turning wheel 4 of the vehicle 1. Other techniques may be implemented to determine the vehicle reference speed VREF. A ground speed of the wheel 4 is determined in dependence on the vehicle reference speed VREF. The vehicle reference speed signal 26 is output to the slip demand calculator 17 and the speed demand calculator 21.

As illustrated in FIG. 4, the speed demand calculator 21 generates a speed demand signal 27 which is output to the inverter 5 to control operation of the electric machine 6. The speed demand signal 27 is indicative of the maximum or minimum allowable respective wheel speed S, depending on whether the vehicle 1 is accelerating (in which case the speed demand signal is indicative of the maximum allowable wheel speed S) or decelerating (in which case the speed demand signal is indicative of the minimum allowable wheel speed S). The speed demand signal 27 comprises a slip component which is generated in dependence on a slip ratio SL generated by the slip demand calculator 17. In the case that the vehicle is accelerating, the speed demand signal 27 is calculated to indicate a wheel speed S that exceeds the ground speed of the wheel 4 (taking into account cornering) by an acceleration slip ratio SL1. In the case that the vehicle is decelerating, the speed demand signal 27 is calculated to indicate a wheel speed S that is less than the ground speed of the wheel (taking into account cornering) by a deceleration slip ratio SL2. As described herein, the controller 7 is configured to optimise the acceleration/deceleration slip ratios SL1, SL2 so as to maximise the effective torque T delivered by the wheel 4. In a modified arrangement, a common slip ratio SL may be defined for both acceleration and deceleration, the controller 7 being configured to add or subtract the common slip ratio SL depending on whether the vehicle 1 is accelerating or decelerating.

The speed demand calculator 21 generates the speed demand signal 27 in dependence on a slip demand signal 28 output by the slip demand calculator 17. The speed demand signal 27 comprises a slip component generated in dependence on the slip demand signal 28. The generation of the slip demand signal 28 in accordance with the present invention is described below. The slip demand signal 28 comprises a slip ratio SL, which is either an acceleration slip ratio SL1 or a deceleration slip ratio SL2 depending on whether the vehicle 1 is accelerating or decelerating. The slip demand calculator 17 specifies the acceleration slip ratio SL1 or the deceleration slip ratio SL2 to control the wheel speed S in order to increase the effective torque T at the wheel 4, preferably maximising the effective torque T.

The speed demand calculator 21 outputs the speed demand signal 27 to control the electric machine 6 to achieve a target speed, substantially equal to that indicated by the speed demand signal 27. The speed demand calculator 21 may execute a local speed control algorithm using the motor position information provided by the feedback signal 24 to estimate the speed of the electric machine 6. An internal closed loop control algorithm such as a proportional-integral-differential (PID) algorithm may be used to control the motor torque and implement a local speed controller. More sophisticated control methodologies may be employed in some embodiments.

The operation of the slip demand calculator 17 to generate the slip demand signal 28 will now be described. As outlined above, the slip demand signal 28 comprises a slip ratio SL. In accordance with the present invention the slip ratio SL is dithered to facilitate optimisation of the effective torque T for improved traction/braking. The slip demand calculator 17 initially sets the acceleration and deceleration slip ratios SL1, SL2 at a predetermined value, for example 5%. The predetermined slip ratios SL1, SL2 may, for example, be set in dependence on an estimated value of a surface coefficient of friction, 'mu', between the wheel 4 and the driving surface at a given moment in time. It is to be understood that the estimated value of mu is maintained by the brake controller 12 and communicated to the controller 7. Methods of estimating surface mu are well known. In the present embodiment the brake controller 12 calculates the value of mu in dependence on the values of vehicle reference speed VREF, individual wheel speed S and the effective torque T to the wheel 4 at any given time. The slip demand calculator 17 may vary the initial setting of the acceleration and deceleration slip ratios SL1, SL2 for different surfaces, for example in dependence on a traction control setting. The initial setting of the acceleration and deceleration slip ratios SL1, SL2 may be higher than 5%, for example as high as 25% on a low-traction surface such as sand.

Figure 5:
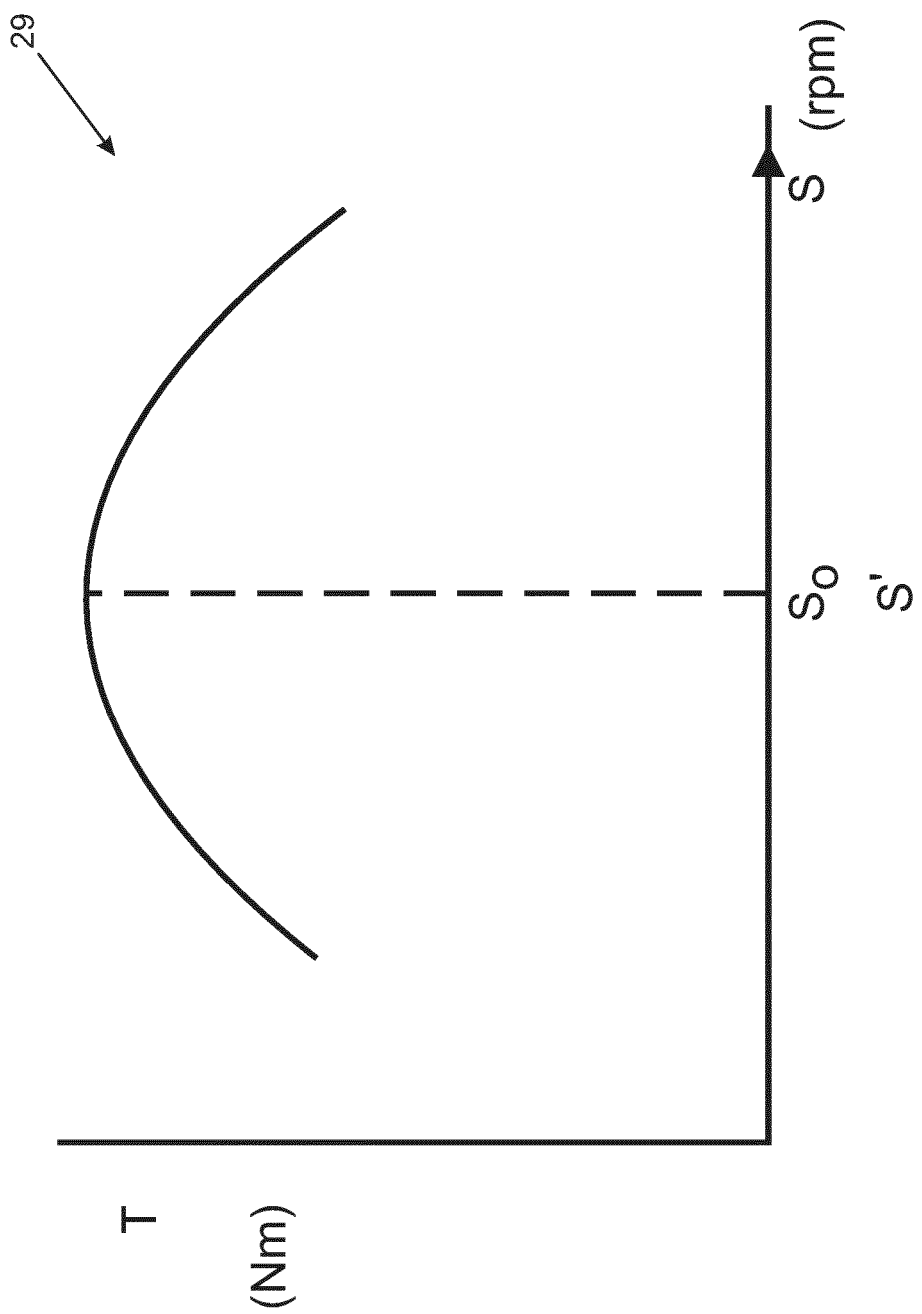
FIG. 5 shows a graph of torque against wheel speed to determine a slip ratio to increase the effective torque at the wheels of the vehicle.

The slip demand calculator 17 varies the slip ratio SL while simultaneously monitoring the instantaneous changes in the effective torque T, as determined by the torque estimator 18. The slip demand calculator 17 seeks to determine a target slip ratio SL' which reduces the instantaneous rate of change of the effective torque T with respect to wheel speed S, as determined by the speed over ground estimator 23. In the present embodiment the slip demand calculator 17 is configured to determine the target slip ratio SL' which minimises the instantaneous rate of change of the effective torque T with respect to wheel speed S. The slip demand calculator 17 determines a derivative of the effective torque T with respect to the wheel speed S (which can be represented as dT/dS). The target slip ratio SL' is the slip ratio SL for which the derivative dT/dS is at a minimum, preferably zero (0). This is illustrated in FIG. 5 which shows a graph 29 of the effective torque T (Nm) plotted against wheel speed S (rpm). The optimum wheel speed S' is the wheel speed S which provides a maximum (peak) effective torque T. The slip demand calculator 17 is configured to identify an optimal slip ratio SL which provides the maximum effective torque T. This optimal slip ratio SL is set as the target slip ratio SL' and is output to the speed demand calculator 21 used to generate the slip component of the speed demand signal 27. This process is performed continuously to enable the speed demand signal 27 to be updated at least substantially in real-time.

The slip demand calculator 17 detects whether the instantaneous rate of change of the effective torque T with respect to wheel speed S (i.e. the derivative dT/dS) is positive or negative and varies the slip ratio SL accordingly. When the vehicle 1 is accelerating, the accelerating slip ratio SL1 is increased when the derivative dT/dS is positive (thereby increasing the wheel speed S); and is decreased when the derivative dT/dS is negative (thereby decreasing the wheel speed S. Conversely, when the vehicle is decelerating, the decelerating slip ratio SL2 is decreased when the derivative dT/dS is positive (thereby increasing the wheel speed S); and is increased when the derivative dT/dS is negative (thereby decreasing the wheel speed S).

The slip demand calculator 17 may vary the acceleration slip ratio SL1 or the deceleration slip ratio SL2 continuously, for example at a rate of 1% per second. The control strategy implemented by the slip demand calculator 17 is the same for both the acceleration slip SL1 and the deceleration slip SL2 and will now be described in general terms with reference to the slip ratio SL.

It will be appreciated that various changes and modifications can be made to the vehicle propulsion apparatus 2 described herein without departing from the scope of the present invention. For example, in the above example, an accurate slip ratio is generated for a given surface, and then the slip ratio is adjusted to determine the ideal slip ratio for maximum traction or braking. This is illustrated in, and with respect to, FIG. 5. To achieve this, the vehicle speed over ground is required so that the slip ratio can be calculated from this, and from the wheel speed measured at the wheel. In some cases, the speed over ground can be difficult to determine, particularly in a 4 wheel drive vehicle operating on rough terrain where the wheels may be slipping. Independent systems such as Doppler radar or camera image processing can be used, but these have their own weaknesses and can be expensive.

Before a low mu event, the vehicle speed may be known approximately from conventional means. This may be from an immediately preceding reading of the wheel speed or from an integration of the vehicle acceleration to approximate the current speed. From this speed and a nominal slip ratio, say 5%, the target wheel speed can be set. Rather than dithering the slip ratio in order to change a slip component of a speed demand signal (to therefore modify the wheel speed), the wheel speed is dithered directly, and the torque changes monitored, to determine the optimum wheel speed for the near instantaneous speed over ground. The processes described above in terms of finding an optimum (or at least more appropriate) slip ratio by dithering the slip ratio and monitoring torque changes, can be applied to directly identifying an optimum (or at least more appropriate) wheel speed for maximum (or at least improved) traction or braking by dithering the wheel speed directly (without calculating a slip ratio and using it to calculate a slip component as an intermediate step). As a result, knowledge of the absolute speed over ground is no longer required because the wheel speed for maximum/improved traction or braking can be continually generated and tracked directly.

A derivative dT/dS of the effective torque T with respect to the wheel speed S can still be used with this technique. In particular, the wheel speed S may be controlled in dependence on the determined derivative dT/dS. The target wheel speed may be the speed at which the determined derivative dT/dS is substantially zero. When the vehicle is accelerating, the speed demand signal may be set to increase the wheel speed S when the determined derivative dT/dS is positive; and to decrease the wheel speed S when the determined derivative dT/dS is negative, and preferably the wheel speed is progressively increased or decreased to maintain a positive value for the determined derivative dT/dS when the vehicle is accelerating. Similarly, when the vehicle is decelerating, the speed demand signal may be set to decrease the wheel speed S when the determined derivative dT/dS is positive; and to increase the wheel speed S when the determined derivative dT/dS is negative, and preferably the wheel speed is progressively increased or decreased to maintain a negative value for the determined derivative dT/dS when the vehicle is decelerating. It will be appreciated that a feedback loop utilising this implementation may be faster than the method in which the slip ratio is continuously recalculated, dithered and used to generate the speed demand signal.

The invention claimed is:

1. A controller for controlling an electric machine to drive a wheel of a vehicle, the controller comprising a processor configured to:
   determine an effective torque (T) transmitted by the wheel to a surface for propelling the vehicle;
   output a speed demand signal for controlling a wheel speed (S) of the wheel;
   detect changes in the effective torque (T) as the wheel speed (S) changes; and
   modify the speed demand signal based on the detected changes in the effective torque (T).

2. A controller as claimed in claim 1, wherein the effective torque (T) is determined at the wheel.

3. A controller as claimed in claim 1, wherein the processor is further configured to receive a wheel speed signal indicative of the wheel speed (S) of said wheel.

4. A controller as claimed in claim 1, wherein the processor is further configured to:
   determine a derivative (dT/dS) of the effective torque (T) with respect to the wheel speed (S); and
   control the wheel speed (S) based on the determined derivative (dT/dS).

5. A controller as claimed in claim 4, wherein the processor is further configured to:
   identify a target wheel speed when the determined derivative (dT/dS) is substantially zero; and
   modify the speed demand signal to control the wheel speed (S) to achieve the target wheel speed.

6. A controller as claimed in claim 4, wherein, when the vehicle is accelerating, the processor is further configured to:
   modify the speed demand signal to increase the wheel speed (S) when the determined derivative (dT/dS) is positive; and
   decrease the wheel speed (S) when the determined derivative (dT/dS) is negative.

7. A controller as claimed in claim 6, wherein the processor is further configured progressively to increase or decrease the wheel speed (S) to maintain a positive value for the determined derivative (dT/dS) when the vehicle is accelerating.

8. A controller as claimed in claim 4, wherein, when the vehicle is decelerating, the processor is further configured to modify the speed demand signal to decrease the wheel speed (S) when the determined derivative (dT/dS) is positive; and to increase the wheel speed (S) when the determined derivative (dT/dS) is negative.

9. A controller as claimed in claim 8, wherein the processor is further configured progressively to increase or decrease the wheel speed (S) to maintain a negative value for the determined derivative (dT/dS) when the vehicle is decelerating.

10. A controller as claimed in claim 4, wherein the speed demand signal comprises a slip component generated in dependence on a slip ratio; the processor being further configured to vary the slip ratio to vary the wheel speed (S).

11. A controller as claimed in claim 10, wherein the processor is further configured to modify the speed demand signal by increasing or decreasing the slip ratio based on the determined derivative (dT/dS).

12. A controller as claimed in claim 10, wherein the processor is further configured to identify the slip ratio when the determined derivative (dT/dS) is substantially zero.

13. A controller as claimed in claim 1, wherein the processor is further configured to determine the effective torque (T) at the wheel based on a commutator current of the electric machine.

14. A controller as claimed in claim 1, wherein the processor is further configured to detect a slip condition and to modify the speed demand signal only when said slip condition has been detected.

15. A controller as claimed in claim 1, wherein the processor is further configured to implement changes in the wheel speed (S) and to detect the changes in the effective torque (T) based on said implemented changes in the wheel speed (S).

16. A controller as claimed in claim 15, wherein the processor is configured to implement changes in the wheel speed (S) by introducing a perturbation into the wheel speed (S).

17. A controller as claimed in claim 1, wherein the controller is configured to control a plurality of electric machines to drive respective wheels of the vehicle.

18. A vehicle comprising a controller as claimed in claim 1.

19. A method of controlling an electric machine to drive a wheel of a vehicle, the method comprising:
   determining an effective torque (T) transmitted by the wheel to a surface for propelling the vehicle;
   detecting changes in the effective torque (T) as a wheel speed (S) of the wheel changes; and
   modifying the wheel speed (S) based on the detected changes in the effective torque (T).

20. A non-transitory, computer-readable medium having instructions stored therein which, when executed by a computing means, cause the computing means to perform the method according to claim 19.

* * * * *